US011882160B1

(12) United States Patent
Turner et al.

(10) Patent No.: US 11,882,160 B1
(45) Date of Patent: Jan. 23, 2024

(54) ASYMMETRIC DATA TRANSMISSION USING EFFICIENCY FEATURES

(71) Applicant: Ethernovia Inc., San Jose, CA (US)

(72) Inventors: Max Klaus Turner, Utrecht (NL); Klaas Bult, Bosch en Duin (NL); Roy T. Myers, Jr., Morgan City, CA (US); Darren S. Engelkemier, Menlo Park, CA (US)

(73) Assignee: Ethemnovia Inc., San Jose, CA (US)

( * ) Notice: Subject to any disclaimer, the term of this patent is extended or adjusted under 35 U.S.C. 154(b) by 0 days.

(21) Appl. No.: 17/663,276

(22) Filed: May 13, 2022

Related U.S. Application Data

(60) Provisional application No. 63/188,228, filed on May 13, 2021.

(51) Int. Cl.
*H04L 65/1069* (2022.01)
*H04L 12/10* (2006.01)
*H04L 69/22* (2022.01)
*H04L 7/04* (2006.01)
*H04W 12/062* (2021.01)
*H04L 12/46* (2006.01)

(52) U.S. Cl.
CPC ............ *H04L 65/1069* (2013.01); *H04L 7/04* (2013.01); *H04L 12/10* (2013.01); *H04L 12/4641* (2013.01); *H04L 69/22* (2013.01); *H04W 12/062* (2021.01)

(58) Field of Classification Search
CPC ....... H04L 65/1069; H04L 7/04; H04L 12/10; H04L 12/4641; H04L 69/22; H04W 12/062
See application file for complete search history.

(56) References Cited

U.S. PATENT DOCUMENTS

| | | | |
|---|---|---|---|
| 6,785,274 B2 * | 8/2004 | Mahajan | H04L 12/4641 370/432 |
| 7,483,450 B1 * | 1/2009 | Giese | H04J 3/0673 370/503 |
| 8,553,709 B2 * | 10/2013 | Diab | G09G 5/006 398/71 |
| 9,485,077 B2 * | 11/2016 | Diab | H04L 5/14 |
| 11,556,164 B2 * | 1/2023 | Ware | G06F 3/0629 |
| 2020/0287995 A1 * | 9/2020 | Park | H04L 12/4625 |
| 2022/0012898 A1 * | 1/2022 | Carreira | G06F 18/214 |

FOREIGN PATENT DOCUMENTS

CN 113170361 B * 1/2023 ........ H04W 36/0069

\* cited by examiner

*Primary Examiner* — Sm A Rahman
(74) *Attorney, Agent, or Firm* — Schwegman Lundberg & Woessner, P.A.

(57) ABSTRACT

Various embodiments provide for asymmetric data transmissions using one or more efficiency features, which can be used in such applications as data network communications between sensors (e.g., cameras, motion, radar, etc.) and computing equipment within vehicles (e.g., smart and autonomous cars), or data network communications between a media server (e.g., movies or music) and a display device (e.g., one in a passenger compartment of a vehicle).

20 Claims, 7 Drawing Sheets

ASYMMETRIC DATA TRANSMISSION USING EFFICIENCY FEATURES

CROSS-REFERENCE TO RELATED APPLICATION

This application claims priority to and the benefit of U.S. Provisional Patent Application No. 63/188,228, filed on May 13, 2021, which is incorporated herein by reference.

TECHNICAL FIELD

Embodiments described herein relate to data communications and, more particularly, to systems, methods, devices, and instructions for asymmetric data transmissions using one or more efficiency features.

BACKGROUND

While Ethernet physical layer standards typically specify symmetric communication systems (e.g., one that supports identical data rate in both directions of a data link, such as 10 Gbps in both directions), certain applications are better suited to use an asymmetric Ethernet-based communication system, where the data rate in one direction of a given data link between two devices is different from the rate in the other direction of the given data link. Examples of such applications include, without limitation, where camera sensors or display devices used in a car are connected to a data communication network, such as an Ethernet network. Using symmetric data communication in such applications can waste a lot of bandwidth, as communication with the camera sensor, or the display device, or the like, can involve far more data in one direction (e.g., video data to the display devices or from the camera sensor) than in the other direction (e.g., control data from the display device or to the camera sensor).

For example, a network-attached display in car may consume a large amount of data but may generate only limited amounts of data, and a network-attached camera sensor included in a car can generate large amount of data but need very limited control input. For instance, a camera sensor being used by an automobile can send multi-gigabits/s data (e.g., camera captures multiple high-resolution picture frames a second) and would only need to receive very little data to control operation of the camera sensor (e.g., basic controls to zoom, pan, etc.). In such an instance, the camera sensor can establish and use an asymmetric data link with a processor of the automobile, where the data rate from the processor to the camera sensor is at a lower rate than the data rate from the camera to the processor. In doing so, the processor (as a data transmitter) and the camera (as a data receiver) can use less power than it would otherwise would if a symmetric data link was used instead.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
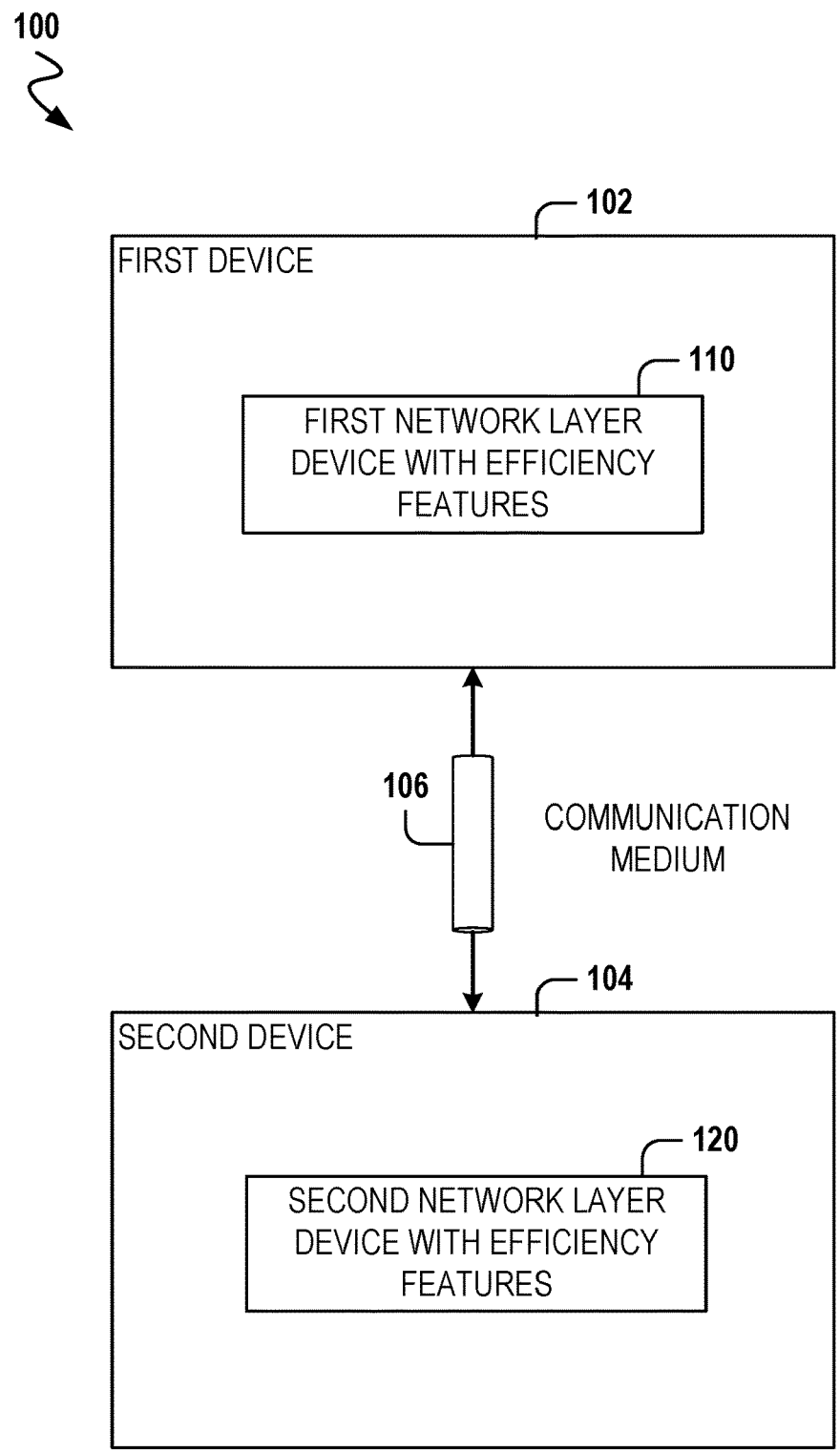
FIG. 1 is a block diagram illustrating an example system comprising a first device and a second device that use asymmetric data transmission with one or more efficiency features, in accordance with some embodiments.

Various embodiments provide for asymmetric data transmissions using one or more efficiency features, which can be used in such applications as data network communications between sensors (e.g., camera, accelerometer, radar, etc.) and computing equipment within vehicles (e.g., in smart and autonomous cars), or data network communications between a media server (e.g., storing movies or music) and a display device (e.g., in the passenger compartment of a vehicle). In particular, some embodiments use one or more techniques with asymmetric data transmission that can achieve one or more efficiencies (e.g., resource efficiencies) with respect to a network layer device that forms part of a device (e.g., a node) on a data communication network. For instance, various embodiments described herein can combine solutions with asymmetric data communication, in new and unique ways, to achieve efficiencies with respect to power (e.g., improved energy consumption by a network layer device), data communication, cost (e.g., using existing available standard solutions and where network layer devices communicating together have identical design), or some combination thereof.

According to various embodiments, a first network layer device establishes an asymmetric data link with a second network layer device, where a low date rate direction (e.g., slower data rate portion) of the asymmetric data link operates on lower clock speeds, and where one or both of the first and the second network layer devices can dynamically disable or re-configure itself (e.g., portions of its hardware) so as to achieve a desired (e.g., low) power consumption while achieving a desired data-rate performance. Some embodiments use an Ethernet network standard for communicating data over the asymmetric data link. For example, an embodiment can use an Energy Efficient Ethernet (EEE) (e.g., IEEE 802.1AZ) to ensure data is transmitted over the asymmetric data link only when data is available. The use of an existing network standard can enable an embodiment to use existing features of the network standard, such as security measures from IEEE 802.1X, in connection with an asymmetric data link as described herein.

Some embodiments described herein use full-duplex communication while communicating over an asymmetric data link described herein (i.e., with different data or line rates in the two directions of the asymmetric data link). In doing so, such embodiments can avoid use of a control signal to have to wait for incoming data from another end, which could be the case with a traditional half-duplex system. Some embodiments described herein use Ethernet (e.g., 802.3) cabling standards, Ethernet signaling (e.g., IEEE802.3 or other ISO/OSI layer one) standards, Ethernet data framing and addressing (e.g., IEEE802.1 or other ISO/OSI layer two) standards, or some combination thereof.

Additionally, some embodiments described herein use an Internet Protocol (IP) (e.g., IPv4, IPv4, or other ISO/OSI layer three) standard for addressing, an existing transport protocol (e.g., an IEEE 1722 standard) standard for control and streaming data transport (e.g., IEEE 1722.1), or a combination thereof.

For various embodiments, network layer devices communicate large data frames, such as jumbo frames, in accordance with an IEEE standard, over an asymmetric data link. Additionally, various embodiments can use data frame preemption in accordance with an IEEE standard (e.g., IEEE 802.1Qbu and 802.3br) in conjunction with communicating large data frames. According to some embodiments, network layer devices implement a mechanism to prevent arrival of multiple large data frames at a receiving network layer device, such as a forwarding or multiplexing node device (e.g., network switch or bridge). For instance, the mechanism can comprise a media clock feature (e.g., in accordance with an IEEE 1722 standard), which can enable a leaf node device (e.g., camera sensor or a media server) to generate data at a defined timeframe or time instance in the future, which can be based on a common understanding of time (e.g., in accordance with an IEEE 802.1AS). This mechanism can also enable update, control, or debug communication (e.g., when time synchronization is not available or not used for a particular application). A mechanism of a transmitting network layer device can also determine, (e.g., agree) with a receiving network layer device, the buffer space to be reserved or used on the receiving network layer device for receiving the large data frames.

For some embodiments, a forwarding or multiplexing node device (e.g., network switch or bridge) that includes a network layer device described herein uses cut-through forwarding or switching, where forwarding decisions by the forwarding/multiplexing node device can be rendered (e.g., made) prior to a data frame being fully received by the forwarding/multiplexing node device and transmission of the data frame on an outgoing data link can begin prior to the data frame being fully received by the forwarding/multiplexing node device.

By use of various embodiments, asymmetric data communication as described herein can achieve efficient use of data bandwidth on a wire link (e.g., high net data throughput). Energy consumption by a network layer device can be reduced with respect to communicating data in low bandwidth direction on an asymmetric data link described herein. Predictable, low latency for streaming data (communicated in the high bandwidth direction) on an asymmetric data link can be achieved, and control data (communicated in low bandwidth direction and, for example, acknowledged in the high bandwidth direction) on the asymmetric data link can be achieved. Memory use (e.g., memory space need) can be reduced for leaf-node devices on a data communication network, such as camera sensors or display devices within, e.g., an automotive environment, that participate in asymmetric data communication as described herein. Additionally, memory use (e.g., memory space need) can be reduced for forwarding or multiplexing node devices (e.g., network switch or bridge) on a data communication network that participates in asymmetric data communication as described herein. By reusing of methods, protocols, elements (e.g., hardware or software elements), or the like, from existing symmetric network solutions, an embodiment can reduce the difficulty, cost, or both for manufacturing or implementing a network layer device described herein. This can provide economies of scale, as the same hardware used for asymmetric data communication as described herein can be used for symmetric data communication, in accordance with an existing network standard (e.g., IEEE 802.1 and IEEE 802.3). For instance, overall hardware cost for a network layer device described herein can be reduced. Further, design for transceiver components on both ends of an asymmetric data link can be identical (e.g., same network layer device hardware can be used on both ends).

Use of various embodiments described herein can be suitable for applications where a first network layer device transmits data at a low data rate to the second network layer device over an asymmetric data link in one direction, and the second network layer device transmits data in a high data rate to the first network layer device over the asymmetric data link in an opposite direction. For instance, where a camera sensor and a processor (e.g., within an automobile) establish an asymmetric data link, the processor can transmit data (e.g., control data) at a low data rate (e.g., 1 Gbps), while the camera sensor can transmit data (e.g., image data in data bursts) at a high data rate (e.g., 10 Gbps). In another instance, where a media server and a display device (e.g., within an automobile) establish an asymmetric data link, the display device can transmit data (e.g., control data) at a low data rate (e.g., 1 Gbps), while the media server can transmit data (e.g., video stream data) at a high data rate (e.g., 10 Gbps).

As used herein, a network layer device can comprise or implement one or more layers of a network device including, but not limited to, layer one (e.g., physical layer (PHY) layer), layer two (e.g., media access control (MAC) layer), or both. As used herein, a node or a node device on a data communication network can comprise a device (e.g., with a hardware processor) coupled to the data communication network and comprising a network layer device that facilities asymmetric data communication as described herein on the data communication network. A forwarding or multiplexing node device can comprise a network (e.g., Ethernet-based) switch or bridge. A leaf node device comprises an edge device, such as a sensor, on a data communication network.

As used herein, an asymmetric data link can comprise two directions of data communication: a low data rate direction (e.g., slower data rate direction) and a high data rate (e.g., faster data rate direction) that is a faster data rate than the low data rate. The asymmetric data link can provide low bandwidth of data communication in the low data rate direction and can provide higher bandwidth of data communication in the high data rate direction. Accordingly, the low data rate direction can also be referred to as a low bandwidth direction, and the high data rate direction can also be referred to as a high bandwidth direction. As used herein, oversampling a signal (e.g., data signal received by a first network layer device from a second network layer device) can comprise sampling at a frequency (e.g., sampling frequency or sampling rate) higher (e.g., significantly higher) than a Nyquist frequency of the signal (e.g., the data signal).

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 comprises a first device 102 and a second device 104 that use asymmetric data transmission with one or more efficiency features, in accordance with some embodiments. Depending on the embodiment, the first device 102 can be implemented (at least in part) by machine 700 of FIG. 7, and the second device 104 can be implemented (at least in part) by machine 700 of FIG. 7. As shown, a communication medium 106 operatively couples the first device 102 to the second device 104, where the communication medium 106 can support an asymmetric data link as described herein, as well as a symmetric data link, in accordance with an existing network standard (e.g., an Ethernet standard). The communication medium 106 can comprise a wire (e.g., twisted pair) that permits transmission of an analog signal. As also shown, the first device 102 comprises a first network layer device 110, and the second device 104 comprises a second network layer device 120. For various embodiments, each of the first network layer device 110 and the second network layer device 120 implements layer one of a network (e.g., PHY layer), layer two of a network (e.g., MAC layer), or both for its respective device (102 and 104, respectively). For instance, the first network layer device 110 represents one or more components of the first device 102 that implement or enable a MAC layer of a network stack of the first device 102, and one or more components of the first device 102 that implement or enable a PHY layer of a network stack of the first device 102. Similarly, the second network layer device 120 represents one or more components of the second device 104 that implement or enable a MAC layer of a network stack of the second device 104, and one or more components of the second device 104 that implement or enable a PHY layer of a network stack of the second device 104. Each of the first network layer device 110 and the second network layer device 120 implement one or more efficiency features or methodologies described herein with respect to various embodiments.

According to some embodiments, the first device 102 represents a sensor, such as a camera sensor that transmits video data, and the second device 104 represents a processing device, such as an aggregator device that aggregates video data or a graphics processing device (e.g., with a graphics processing unit (GPU)) that process video data (e.g., for image recognition). Additionally, for some embodiments, the first device 102 represents a media source device, such as a media server that provides data for one or more media items (e.g., video or audio items), and the second device 104 represents a media player device, such as a display device that can display video data streamed from the media server.

Figure 2:
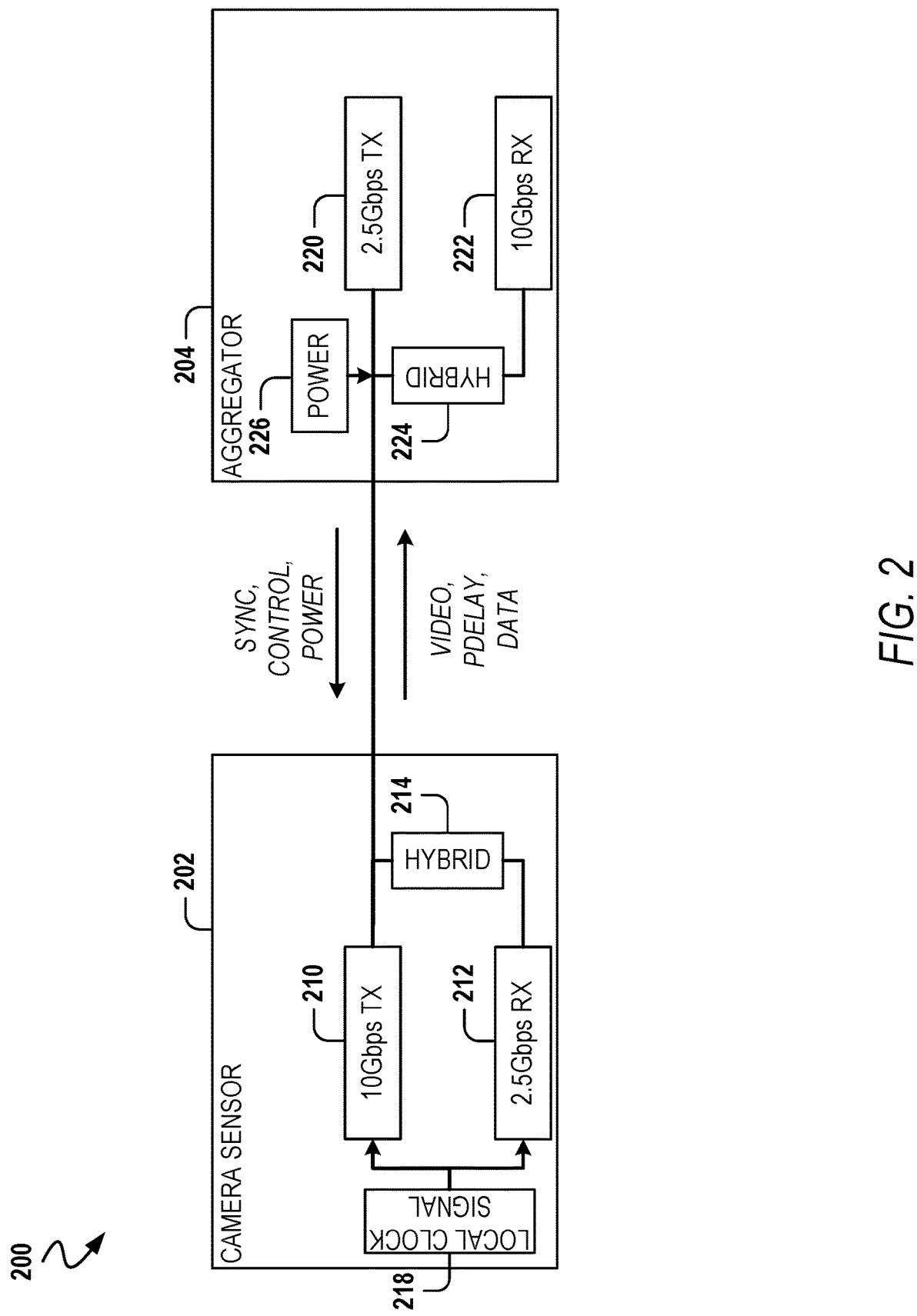
FIG. 2 is a block diagram illustrating an example system comprising a camera sensor and an aggregator that use asymmetric data transmission with one or more efficiency features, in accordance with some embodiments.

FIG. 2 is a block diagram illustrating an example system 200 comprising a camera sensor 202 and an aggregator 204 that use asymmetric data transmission with one or more efficiency features, in accordance with some embodiments. Depending on the embodiment, each of the camera sensor 202 and the aggregator 204 can be implemented as a node device on a data communication network. Though shown as an aggregator, for some embodiments, the aggregator 204 could be replaced or include a graphic processing device, such as a device with a GPU. For some embodiments, the aggregator 204 receives data transmitted by the camera sensor 202, such as video or image data, and aggregates the data over time. According to various embodiments, the camera sensor 202 and the aggregator 204 are configured to establish an asymmetric data link, where the asymmetric data link provides a high data rate of data communication from the camera sensor 202 to the aggregator 204 and a low data rate of data communication from the aggregator 204 to the camera sensor 202, where the low data rate is lower than the high data rate. For instance, as shown, the asymmetric data link established between the camera sensor 202 and the aggregator 204, where the camera sensor 202 transmits data to the aggregator 204 at a data rate of 10 Gbps, the camera sensor 202 receives data from the aggregator 204 at a data rate of 2.5 Gbps, the aggregator 204 transmits data to the camera sensor 202 at a data rate of 2.5 Gbps, and the aggregator 204 receives data from the camera sensor 202 at a data rate of 10 Gbps. Accordingly, the camera sensor 202 comprises a 10 Gbps transmitter (TX) component 210, a 2.5 Gbps receiver (RX) component 212, and a hybrid component 214 that permits the camera sensor 202 to transmit data to the aggregator 204 using the 10 Gbps TX component 210 and permits the camera sensor 202 to receive data from the aggregator 204 using the 2.5 Gbps RX component 212. For instance, during asymmetric data communication operation, the hybrid component 214 can enable the camera sensor 202 to use the 2.5 Gbps RX component 212 to receive and process a data signal transmitted from the aggregator 204. During symmetric data communication operation, the hybrid component 214 can stop providing the 2.5 Gbps RX component 212 with a data signal transmitted from the aggregator 204, and the camera sensor 202 can use another 10 Gbps RX component (not shown) to receive and process a data signal transmitted from the aggregator 204.

According to some embodiments, the 10 Gbps TX component 210 and the 2.5 Gbps RX component 212 use the same local clock signal (provided by a local clock signal component 218) to operate. For instance, the 10 Gbps TX component 210 can use the local clock signal (provided by the local clock signal component 218) to generate a first data signal for carrying first data (e.g., a first set of data frames) to the aggregator 204 at the 10 Gbps data rate, where the first data signal is transmitted to the aggregator 204 and received by the aggregator 204 (e.g., the 10 Gbps RX component 222). The 2.5 Gbps RX component 212 can receive (via the hybrid component 214) a second data signal transmitted from the aggregator 204, and can extract, from the second data signal, second data (e.g., a second set of data frames) carried by the second data signal by oversampling the second data signal using the local clock signal (provided by the local clock signal component 218). Doing so can simplify at least a portion of the design (e.g., simplify the circuit) of the network layer device of the camera sensor 202 and can also permit the camera sensor 202 (e.g., the network layer device thereof) to reduce the power consumption used for data communication. For instance, during full-duplex symmetric data communication operation, the 10 Gbps TX component 210 operating on the local clock signal (provided by the local clock signal component 218) can consume power P, while a 10 Gbps RX component (not shown) operating on the local clock signal (provided by the local clock signal component 218) can consume a higher multiple of that power (e.g., 3×P). In comparison to the 10 Gbps RX component, during full-duplex asymmetric data communication operation, the 2.5 Gbps RX component 212 operating on the local clock signal (provided by the local clock signal component 218) can consume a fraction of the power consumed by the 10 Gbps TX component 210 (e.g., 0.75×P). Depending on the embodiment, the local clock signal component 218 can represent a local clock generator of a network layer device of the camera sensor 202 or a clock input of the network layer device, where the clock input can receive a clock signal generated (e.g., by another component of the camera sensor 202) external to the network layer device.

The aggregator 204 comprises a 2.5 Gbps transmitter (TX) component 220, a 10 Gbps receiver (RX) component 222, and a hybrid component 224 that permits the aggregator 204 to transmit data to the camera sensor 202 using the 2.5 Gbps TX component 220 and permits the aggregator 204 to receive data from the camera sensor 202 using the 10 Gbps RX component 222. The aggregator 204 also comprises a power component 226, which can enable the aggregator 204 to not only control a power state (e.g., on or off state) of the camera sensor 202, but also distribute power to the camera sensor 202 (e.g., using power of data line (PoDL)).

The 10 Gbps TX component 210, the 2.5 Gbps RX component 212, and the hybrid component 214 can form at least a portion of a network layer device of the camera sensor 202. The network layer device of the camera sensor 202 can include the local clock signal component 218. Similarly, the 2.5 Gbps TX component 220, the 10 Gbps RX component 222, and the hybrid component 224 can form at least a portion of a network layer device of the aggregator 204. The network layer device of the aggregator 204 can include the power component 226.

As shown, data transmitted from the camera sensor 202 to the aggregator 204 can include, without limitation, video data (e.g., generated for video captured by the camera sensor 202), pDelay synchronization information, and other data (e.g., responses to control requests received by the camera sensor 202 from the aggregator 204). Data transmitted from the aggregator 204 to the camera sensor 202 can include, without limitation, synchronization information and control information.

Figure 3:
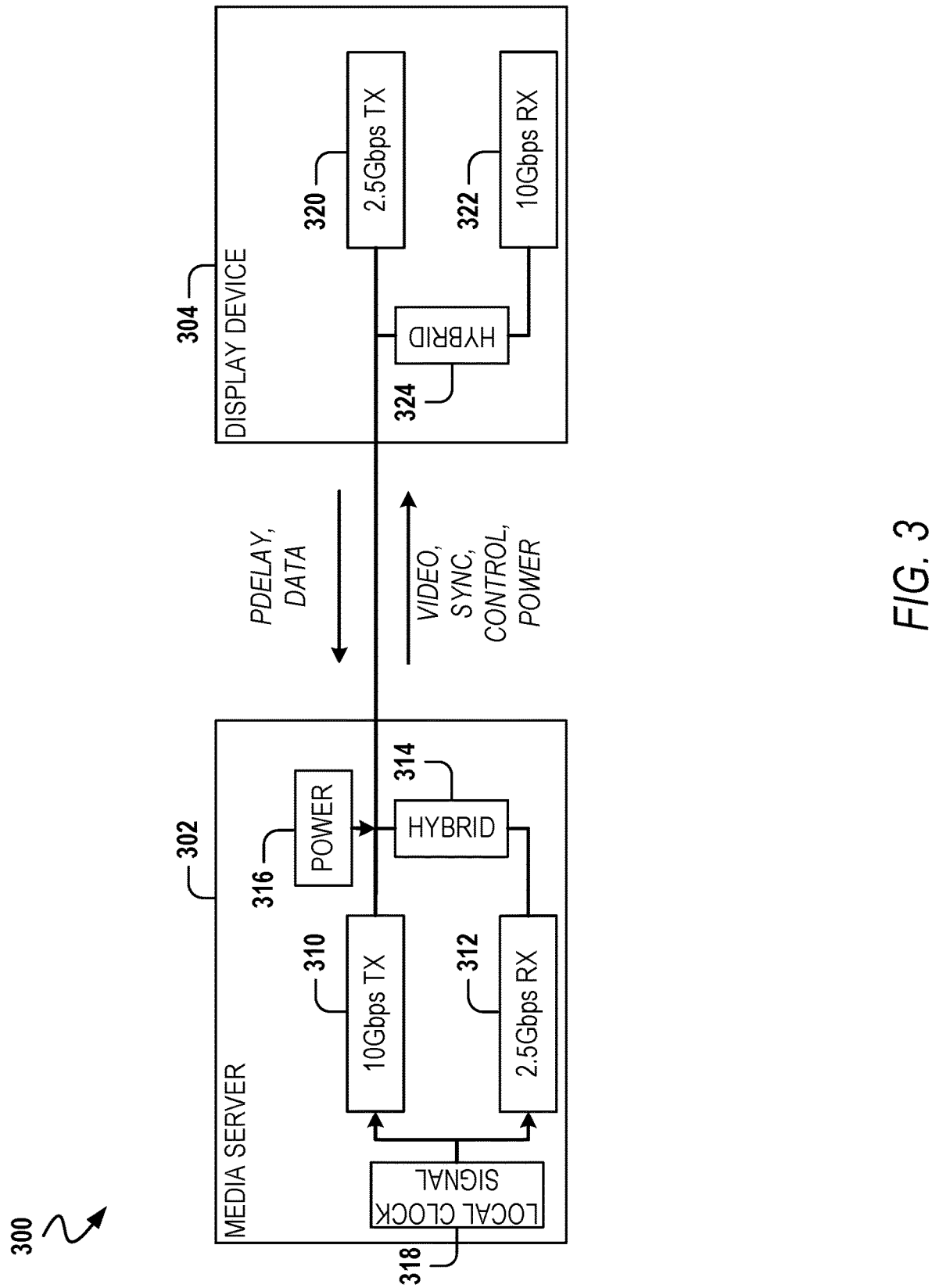
FIG. 3 is a block diagram illustrating an example system comprising a media server and a display device that use asymmetric data transmission with one or more efficiency features, in accordance with some embodiments.

FIG. 3 is a block diagram illustrating an example system 300 comprising a media server 302 and a display device 304 that use asymmetric data transmission with one or more efficiency features, in accordance with some embodiments. Depending on the embodiment, each of the media server 302 and the display device 304 can be implemented as a node device on a data communication network. For some embodiments, the aggregator 204 receives data transmitted by from the camera sensor 202 and aggregates the data over time, such as video or image data. In particular, the system 300 of FIG. 3 is similar to the system 200 of FIG. 2, but where a media server 302 replaces the camera sensor 202 and a display device 304 replaces the aggregator 204. Accordingly, components 310, 312, 314, 318 of the media server 302 can be respectively similar to the components 210, 212, 214, 218 of the camera sensor 202, and the components 320, 322, 324 of the display device 304 can be respectively similar to the components 220, 222, 224 of the aggregator 204.

Unlike with the camera sensor 202 and the aggregator 204 of the system 200, the data transmitted from the media server 302 to the display device 304 can include, without limitation, video data (e.g., generated for video stored and served by the media server 302), synchronization information, and control information (e.g., controlling operating parameters of the display device 304). Data from the display device 304 can include, without limitation, pDelay synchronization information, and other data (e.g., responses to control requests received by the display device 304 from the media server 302). As also shown, the media server 302 (rather than the display device 304) comprises a power component 316, which can enable the media server 302 to not only control power state (e.g., on or off state) of the display device 304, but also distribute power to the display device 304 (e.g., using PoDL).

Though not illustrated or described with respect to FIGS. 2 and 3, it will be understood that one or more other efficiency features described herein can be used with respect to either system 200 of FIG. 2 or the system 300 of FIG. 3.

Figure 4:
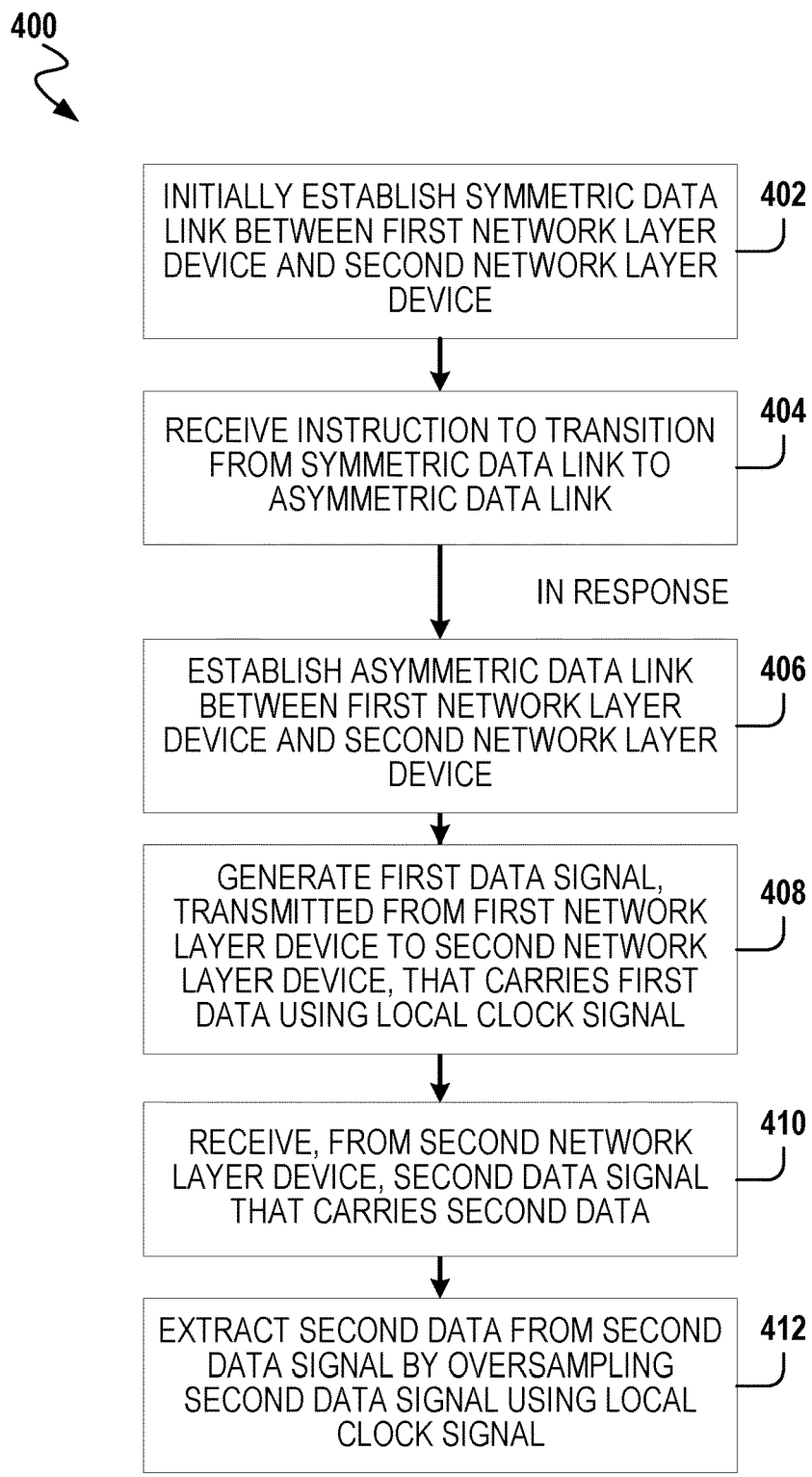
FIGS. 4 through 6 are flowcharts illustrating example methods for asymmetric data transmissions using one or more efficiency features, in accordance with some embodiments.
Figure 5:
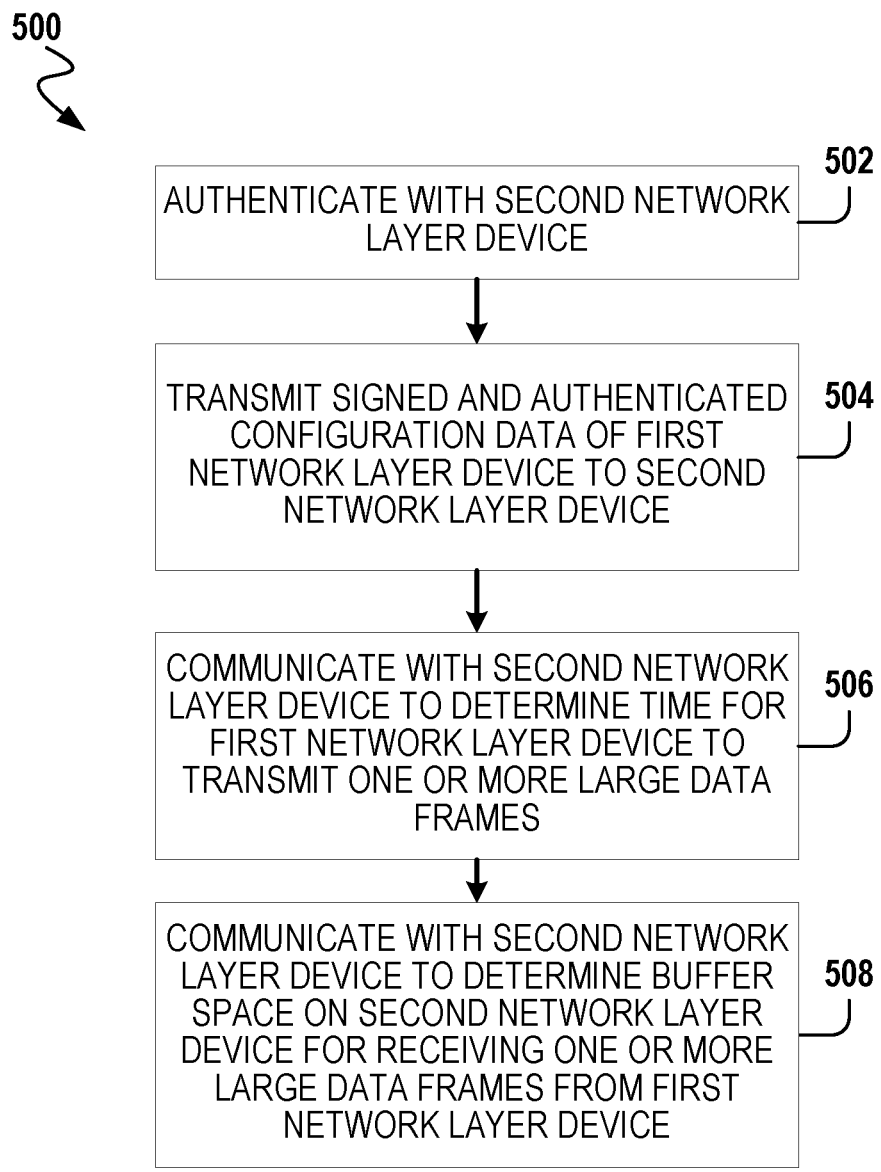
Figure 6:
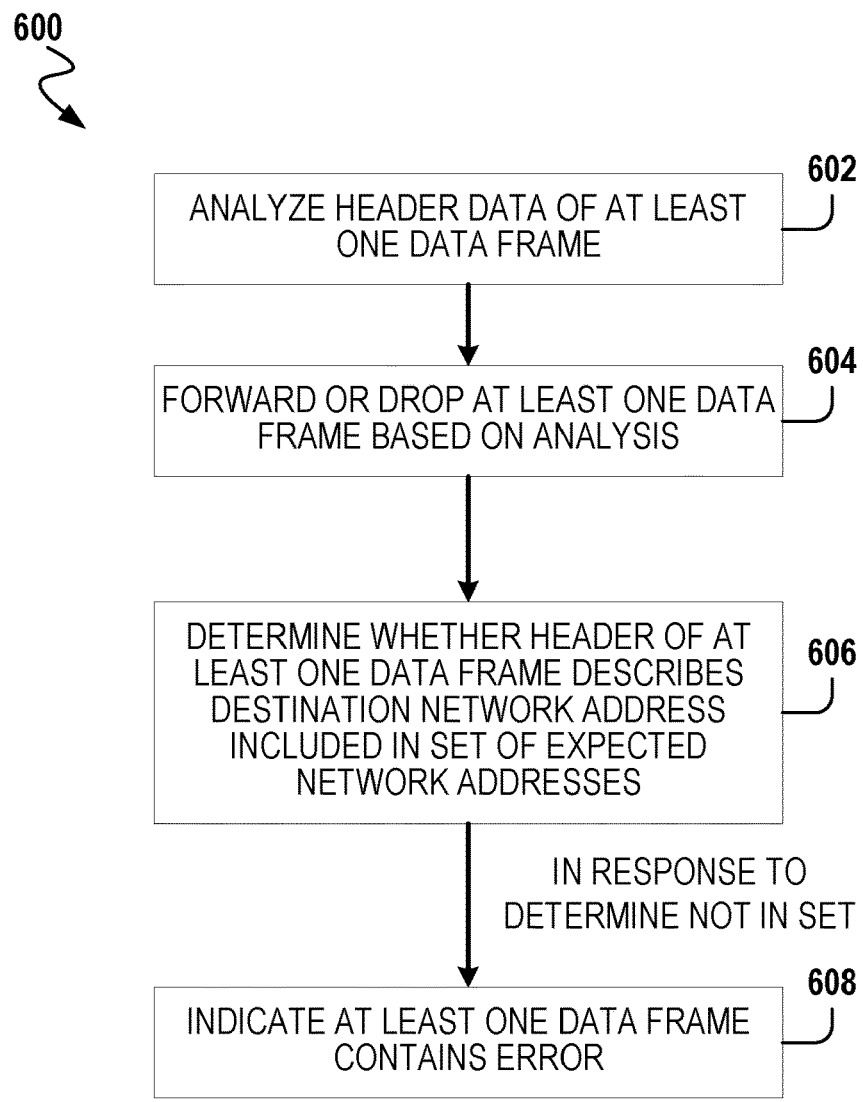

FIGS. 4 through 6 are flowcharts illustrating example methods 400, 500, 600 for asymmetric data transmissions using one or more efficiency features, in accordance with some embodiments. It will be understood that example methods described herein may be performed by various circuit components, including, for example, addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 400, 500, 600 may be performed at least in part by the first network layer device 110 of FIG. 1, the second network layer device 120 of FIG. 1, or both. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 4, at operation 402, a first network layer device (e.g., 110) initially establishes a symmetric data link with a second network layer device (e.g., 120) over a data transmission medium, in accordance with (e.g., using) a networking standard, such as an Ethernet standard (e.g., IEEE 802.3, such as an Energy Efficient Ethernet standard). For various embodiments, data is communicated over the symmetric data link in a first direction from the first network layer device to the second network layer device, and in a second (opposite) direction from the second network layer device to the first layer device, at a same data rate. Depending on the embodiment, the same date rate used by the symmetric data link can be a high data rate or a low data rate. Additionally, the symmetric data link can comprise a full-duplex, symmetric data link.

After the symmetric data link is established, at operation 404, the first network layer device (e.g., 110) receives an instruction to transition to an asymmetric data link between the first network layer device (e.g., 110) and the second network layer device (e.g., 120). For instance, an upper layer network component (e.g., application layer) of a node device that includes the first network layer device (e.g., 110) determines whether to transition the first network layer device (e.g., 110) to asymmetric data communication operation and, as such, instructs the first network layer device (e.g., 110) to transition to the asymmetric data link. In response to the instruction, operation 406 can be performed.

At operation 406, the first network layer device (e.g., 110) establishes an asymmetric data link between the first network layer device and the second network layer device over the data transmission medium, in accordance with (e.g., using) a networking standard, such as an Ethernet standard. For various embodiments, data is communicated over the asymmetric data link in a first direction from the first network layer device (e.g., 110) to the second network layer device (e.g., 120) at a first data rate, and data is communicated over the asymmetric data link in a second direction from the second network layer device (e.g., 120) to the first layer device (e.g., 110) using a second data rate that is lower than the first data rate, where the second direction is opposite to the first direction. The first direction can be referred to as a high bandwidth direction of the asymmetric data link, and the second direction can be referred to as a low bandwidth direction of the asymmetric data link. For instance, in certain applications, the first data rate can be 10 Gbps and the second data rate can be 2 Gbps, where the first data rate is the high data rate and the second data rate is the low data rate. The asymmetric data link can comprise a full-duplex, asymmetric data link.

At operation 408, the first network layer device (e.g., 110) generates, using a local clock signal associated with the first network layer device (e.g., 110), a first data signal that carries first data, where the first data signal is transmitted from the first network layer device to the second network layer device over the data transmission medium. Depending on the embodiment, the local clock signal can be one generated by a component of the first network layer device (e.g., 110) or one generated by a component external to the first network layer device (e.g., 110) and received by the first network layer device (e.g., 110) via a clock input.

At operation 410, the first network layer device (e.g., 110) receives, from the second network layer device (e.g., 120), a second data signal that carries second data. Subsequently, at operation 412, the first network layer device (e.g., 110) extracts the second data from the second data signal by oversampling the second data signal using the local clock signal. For various embodiments, operations 408 and 412 represent implementation of at least one efficiency technique described herein, where a common clock signal (e.g., local clock signal) is used by both a transmit and a receive component of the first network layer device (e.g., 110) to communicate data over the asymmetric data link. As noted herein, this efficiency technique at can achieve a reduction in power consumption by the first network layer device (e.g., 110) over a solution that uses two different clock signals for the transmit and receive components for asymmetric data communication.

Referring now to FIG. 5, the method 500 can represent additional operations the first network layer device (e.g., 110) can perform in connection with establishing or maintaining an asymmetric data link with the second network layer device (e.g., 120). For instance, one or more of operations 502 through 508 can be performed prior to, or as part of, operation 406 of the method 400 described with respect to FIG. 4.

At operation 502, the first network layer device (e.g., 110) authenticates with the second network layer device (e.g., 120), in accordance with the networking standard. For instance, the first network layer device (e.g., 110) can authenticate with the second network layer device (e.g., 120), in accordance with an Ethernet standard, such as IEEE 802.1X. After the first network layer device (e.g., 110) successfully authenticates with the second network layer device, at operation 504, the first network layer device (e.g., 110) transmits (e.g., sends) signed and authenticated configuration data for the second network layer device (e.g., 120). For some embodiments, the signed and authenticated configuration data describes (e.g., provides information regarding) a port configuration of the first network layer device (e.g., 110). For instance, the port configuration can be for a port of the first network layer device (e.g., 110) that couples the first network layer device (e.g., 110) to the second network layer device (e.g., 120). Depending on the embodiment, the port configuration can comprise at least one of a set of multicast forwarding rules associated with the first network layer device (e.g., 110) or a virtual local area network (VLAN) membership of (e.g., the port of) the first network layer device (e.g., 110).

For some embodiments, at least some data is communicated over the asymmetric data link from the first network layer device (e.g., 110) to the second network layer device (e.g., 120) using one or more large data frames, such as jumbo data frames. Generally, if the first network layer device (e.g., 110) transmits large data frames to the second network layer device (e.g., 120) in an uncoordinated fashion (e.g., the devices have not agreed in advance on a time of transmission or number of large data frames to be transmitted), the second network layer device (e.g., 120) would need access to a buffer that is large enough to process the large data frames. This is especially the case where the second network layer device (e.g., 120) is a forwarding or multiplexing node device and is configured to forward the large data frames to another destination.

Accordingly, at operation 506, the first network layer device (e.g., 110) communicates (e.g., coordinates) with the second network layer device (e.g., 120) to determine (e.g., agree upon) a time for the first network layer device to transmit one or more large data frames (e.g., jumbo data frames) to the second network layer device (e.g., 120). For instance, the first network layer device (e.g., 110) can use one or more features of an IEEE 1722 standard (e.g., a media-clock based on IEEE 1722) to agree on a time (e.g., at a defined time instances in the future) for the first network layer device (e.g., 110) to transmit the one or more large data frames to the second network layer device (e.g., 120).

At operation 508, the first network layer device (e.g., 110) communicates (e.g., coordinates) with the second network layer device (e.g., 120) to determine (e.g., agree upon) a buffer space on the second network layer device (e.g., 120) for receiving the one or more jumbo data frames. In doing so, the first network layer device (e.g., 110) can ensure that the second network layer device (e.g., 120) has sufficient buffer space to process (e.g., forward) the one or more large data frames received from the first network layer device (e.g., 110).

For some embodiments, operations 506 and 508 represent implementation of at least one efficiency technique described herein, where a mechanism is used to prevent arrival of multiple large data chunks at the second network layer device (e.g., 120), such as when the second network layer device is a forwarding or multiplexing node device (e.g., network switch or bridge). For some embodiments, operations 506 and 508 can represent a single operation performed by the first network layer device (e.g., 110).

Referring now to FIG. 6, the method 600 can represent operations the second network layer device (e.g., 120) can perform in connection with facilitating data communication with the first network layer device (e.g., 110) over an asymmetric data link. For instance, one or more of operations 602 through 608 can be performed in response to the second network layer device (e.g., 120) receiving the second data signal generated and transmitted by the first network layer device (e.g., 110) as part of operation 408 of the method 400 described with respect to FIG. 4.

For some embodiments, the second network layer device (e.g., 120) is configured to perform cut-through forwarding of one or more data frames received from the first network layer device (e.g., 110). For instance, the second network layer device (e.g., 120) can form part of a forwarding or multiplexing node device coupled to the first network layer device (e.g., 110) of another node device. According to some embodiments, the cut-through forwarding is adapted to perform (e.g., adapted such that the second network layer device performs) an error check (e.g., brief error check) on at least one of the one or more data frames. The error check can be performed by the second network layer device (e.g., 120) by performing one or more of operation 602 and 608.

At operation 602, the second network layer device (e.g., 120) analyzes header data of at least one of the one or more data frames. For instance, the second network layer device (e.g., 120) can generate analysis of a plurality of headers defined by the header data (e.g., the second network layer device analyzes headers provided by the header data layerby-layer). Thereafter, at operation 604, the second network layer device (e.g., 120) either forwards or drops the at least one data frame based on the analysis generated by operation 602. For instance, if the analysis indicates an error in the header information, the second network layer device (e.g., 120) can drop the at least one data frame instead of forwarding the at least one data frame according to a destination network address described by its header data. However, if no error is detected in the header data, the at least one data frame can be forwarded by the second network layer device (e.g., 120) based on the destination network address. Operations 602 and 604 represent a more flow-based approach for the second network layer device to perform cut-through forwarding.

At operation 606, the second network layer device (e.g., 120) determines whether a header of the at least one data frame describes a destination network address that is included in a set of expected network addresses. The set of expected network addresses can be facilitated (e.g., generated or determined) by pre-assigning node devices (e.g., their respective network layer devices) with a special range of network addresses for cut-through forwarding purposes. For example, a special range of layer two addresses (e.g., MAC addresses) can be pre-assigned to node devices and their respective network layer devices. Pre-assigning a network address to a node device can comprise selecting the network address from a set of locally administered MAC addresses (e.g., LAA multicast MAC addresses), where the selection can consider a hamming distance of the node device. The address assignment can be dynamic and can facilitated by a protocol, such as MAAP of an IEEE 1722 standard, or by a service-discovery, such as SOME/IP-SD, where snooping of the data in a forwarding or multiplexing node device is used to configure forwarding before a data frame arrives.

In response to the second network layer device (e.g., 120) determining that the destination network address is not included in the set of expected network addresses, at operation 608, the second network layer device (e.g., 120) can indicate that the at least one data frame contains an error (e.g., at least a header error). As a result, the at least one data frame can be dropped, which can effectively prevent the at least one data frame from being forwarded to another node device.

Figure 7:
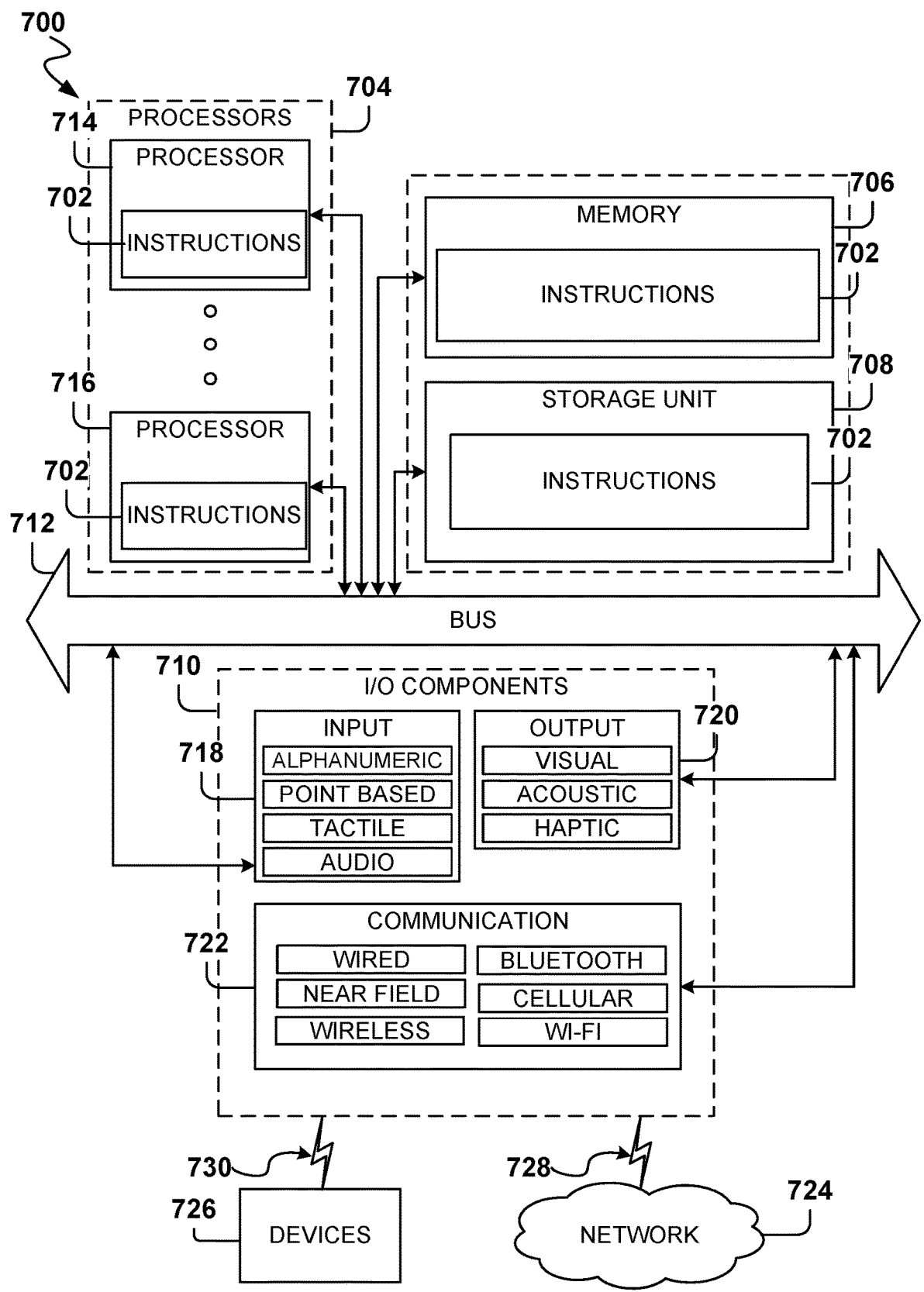
FIG. 7 is a block diagram illustrating components of an example machine that can use one or more embodiments discussed herein.

FIG. 7 is a block diagram illustrating components of an example machine 700 that can use one or more embodiments discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform one or more operations that may make use of one or more of the methodologies discussed herein. For example, the instructions 702 include executable code that causes the machine 700 to execute one or more operations that cause a network layer device of the machine 700 (e.g., embodied by communication components 722) to perform the method 400, 500, or 600. The machine 700 may be coupled (e.g., networked) to other machines. Depending on the embodiment, the machine 700 can implement at least some portion of the first device 102 or the second device 104.

By way of non-limiting example, the machine 700 may comprise or correspond to a television, a computer (e.g., a server computer, a client computer, a personal computer (PC), a tablet computer, a laptop computer, or a netbook), a personal digital assistant (PDA), a smart phone, a mobile device, an automotive electronic control unit (ECU), or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702.

The machine 700 may include processors 704, memory 706, a storage unit 708, and input/output (I/O) components 710, which may be configured to communicate with each other such as via a bus 712. In some embodiments, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform one or more operations that makes use of one or more of the methodologies described herein (e.g., the method 400, 500, or 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal.

However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730, respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices. According to various embodiments, the communication components 722 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a first network layer device configured to communicate data with a second network layer device over a data transmission medium that comprises a wire, and to perform operations comprising:
establishing an asymmetric data link between the first network layer device and the second network layer device over the data transmission medium, in accordance with a networking standard, data being communicated over the asymmetric data link in a first direction from the first network layer device to the second network layer device at a first data rate, data being communicated over the asymmetric data link in a second direction from the second network layer device to the first network layer device using a second data rate that is lower than the first data rate;

generating, using a common local clock signal associated with the first network layer device, a first data signal that carries first data, the first data signal being transmitted from the first network layer device to the second network layer device over the asymmetric data link;

receiving, from the second network layer device, a second data signal that carries second data over the asymmetric data link; and extracting the second data from the second data signal by oversampling the second data signal using the common local clock signal that is used to generate the first data signal.

2. The system of claim 1, wherein the networking standard is an Energy Efficient Ethernet standard.

3. The system of claim 1, wherein the asymmetric data link is a full-duplex link, and data is communicated over the asymmetric data link from the first network layer device to the second network layer device using one or more large data frames.

4. The system of claim 3, wherein the operations comprise:

communicating with the second network layer device to determine a time for the first network layer device to transmit the one or more large data frames to the second network layer device, and to determine a buffer space to be reserved on the second network layer device and used by the second network layer device for receiving the one or more large data frames.

5. The system of claim 1, wherein the second network layer device is configured to perform cut-through forwarding of one or more data frames received from the first network layer device, the cut-through forwarding being adapted to perform an error check on at least one of the one or more data frames, the error check comprising:

determining whether a header of the at least one data frame describes a destination network address that is included in a set of expected network addresses; and in response to determining that the destination network address is not included in the set of expected network addresses, indicating that the at least one data frame contains an error.

6. The system of claim 1, wherein the second network layer device is configured to perform forwarding of one or more data frames received from the first network layer device, the forwarding comprising:

analyzing header data of at least one of the one or more data frames, the analyzing comprising generating analysis of a plurality of headers defined by the header data; and forwarding or dropping the at least one data frame based on the analysis.

7. The system of claim 1, wherein the operations comprise:

initially establishing a symmetric data link with the second network layer device over the data transmission medium, in accordance with the networking standard, data being communicated over the symmetric data link in the first direction from the first network layer device to the second network layer device at the second data rate, data being communicated over the symmetric data link in the second direction from the second network layer device to the first network layer device at the second data rate; and receiving an instruction to transition to the asymmetric data link after the symmetric data link is established, the establishing of the asymmetric data link being performed in response to the instruction.

8. The system of claim 1, wherein the operations comprise:

initially establishing a symmetric data link with the second network layer device over the data transmission medium, in accordance with the networking standard, data being communicated over the symmetric data link in the first direction from the first network layer device to the second network layer device at the first data rate, data being communicated over the symmetric data link in the second direction from the second network layer device to the first network layer device at the first data rate; and receiving an instruction to transition to the asymmetric data link after the symmetric data link is established, the establishing of the asymmetric data link being performed in response to the instruction.

9. The system of claim 1, wherein the second network layer device is configured to forward one or more data frames received from the first network layer device, the operations comprising:

authenticating with the second network layer device, in accordance with the networking standard; and after successful authentication with the second network layer device, transmitting signed and authenticated configuration data to the second network layer device, the signed and authenticated configuration data describing a port configuration of the first network layer device.

10. The system of claim 9, wherein the port configuration comprises at least one of a set of multicast forwarding rules associated with the first network layer device or a virtual local area network (VLAN) membership of the first network layer device.

11. The system of claim 1, comprising:

a camera sensor that generates video data and that comprises the first network layer device, the first data comprising the video data.

12. The system of claim 11, comprising:

a video source aggregator device that aggregates the video data from the first data and that comprises the second network layer device.

13. The system of claim 11, comprising:

a graphic processing device that processes the video data in the first data and that comprises the second network layer device.

14. The system of claim 11, wherein the second network layer device is configured to distribute power to the camera sensor using power over data line (PoDL).

15. The system of claim 1, comprising:

a media server that provides video data and that comprises the first network layer device, the first data comprising the video data.

16. The system of claim 15, comprising:

a display device that displays the video data from the first data and that comprises the second network layer device.

17. The system of claim 16, wherein the first network layer device is configured to distribute power to the display device using power over data line (PoDL).

18. The system of claim 1, wherein the first network layer device implements at least one of a media access controller (MAC) layer or a physical (PHY) layer.

19. A system comprising:
a first network layer device configured to communicate data with a second network layer device over a data transmission medium that comprises a wire, and to perform operations comprising:
establishing an asymmetric data link between the first network layer device and the second network layer device over the data transmission medium, in accordance with a networking standard, data being communicated over the asymmetric data link in a first direction from the first network layer device to the second network layer device at a first data rate, data being communicated over the asymmetric data link in a second direction from the second network layer device to the first network layer device using a second data rate that is lower than the first data rate;
generating, using a first local clock signal of the first network layer device, a first data signal that carries first data, the first data signal being transmitted from the first network layer device to the second network layer device over the asymmetric data link;
receiving, from the second network layer device, a second data signal that carries second data over the asymmetric data link;
extracting the second data from the second data signal by sampling the second data signal using a second local clock signal, the first local clock signal being slower than the second local clock signal; and
communicating with the second network layer device to determine a time for the first network layer device to transmit one or more large data frames to the second network layer device, and to determine a buffer space to be reserved on the second network layer device and used by the second network layer device for receiving the one or more large data frames.

20. A method comprising:
establishing, by a first network layer device, an asymmetric data link between the first network layer device and a second network layer device over a data transmission medium that comprises a wire, in accordance with a networking standard, data being communicated over the asymmetric data link in a first direction from the first network layer device to the second network layer device at a first data rate, data being communicated over the asymmetric data link in a second direction from the second network layer device to the first network layer device using a second data rate that is lower than the first data rate;
generating, using a common local clock signal of the first network layer device, a first data signal that carries first data, the first data signal being transmitted from the first network layer device to the second network layer device over the asymmetric data link;
receiving, from the second network layer device, a second data signal that carries second data over the asymmetric data link; and
extracting the second data from the second data signal by oversampling the second data signal using the common local clock signal that is used to generate the first data signal.

* * * * *